(12) United States Patent
Yousef

(10) Patent No.: US 7,855,959 B2
(45) Date of Patent: Dec. 21, 2010

(54) FAST COMMON OVERHEAD SERVICES ACQUISITION FOR MEDIAFLO

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 219 days.

(21) Appl. No.: 12/110,658

(22) Filed: Apr. 28, 2008

(65) Prior Publication Data

US 2009/0268656 A1 Oct. 29, 2009

(51) Int. Cl.
 G01R 31/08 (2006.01)
 H04L 1/00 (2006.01)
(52) U.S. Cl. ............ 370/230; 370/315; 370/329; 370/206; 370/352; 714/748; 455/566; 455/436
(58) Field of Classification Search .......... 370/315, 370/230, 312, 329, 206, 345, 352, 348, 346, 370/445; 455/566, 436; 714/748; 713/323; 709/225, 230; 375/240.25, 240.01
See application file for complete search history.

(56) References Cited

U.S. PATENT DOCUMENTS

| | | | | |
|---|---|---|---|---|
| 5,734,833 | A * | 3/1998 | Chiu et al. | 709/225 |
| 2005/0141475 | A1 * | 6/2005 | Vijayan et al. | 370/345 |
| 2006/0195752 | A1 * | 8/2006 | Walker et al. | 714/748 |
| 2007/0140322 | A1 * | 6/2007 | Wang et al. | 375/149 |

* cited by examiner

Primary Examiner—Aung S Moe
Assistant Examiner—Jamal Javaid
(74) Attorney, Agent, or Firm—Rahman LLC

(57) ABSTRACT

A technique for fast common overhead services acquisition for MediaFLO™ mobile multimedia multicast system, wherein encoding overhead information symbol (OIS) information in a first burst of MLC of each superframe, OIS comprises control channel (CC) information and reserved flow data comprising primary flow data, service information data, notification flow data, configuration flow data, and presentation metadata; encoding padding in second MLC burst; encoding parity bytes in third and fourth MLC bursts; encoding primary flow data in final MLC burst per superframe; encoding the remaining reserved flow data at the end of superframe; transmitting wireless data stream comprising first MLC at ½ forward error correction (FEC) rate and receiving it in receiver; determining a correctness of CC information by checking cyclic redundancy check (CRC) bits at the end of each received data packet; and transmitter sending size wise remainder of reserved flows at the end of superframe.

20 Claims, 8 Drawing Sheets

FAST COMMON OVERHEAD SERVICES ACQUISITION FOR MEDIAFLO

BACKGROUND

1. Technical Field

The embodiments herein generally relate to wireless communications, and, more particularly, a method for fast common overhead services acquisition for a MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Furthermore, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data.

SUMMARY

In view of the foregoing, an embodiment herein provides a method for fast common overhead services acquisition for MediaFLO™ (forward link only) mobile multimedia multicast system, and a program storage device readable by computer, tangibly embodying a program of instructions executable by the computer to perform the method for fast common overhead services acquisition for a MediaFLO™ (Forward Link Only) system, wherein the method comprises a transmitter that transmits a wireless data stream comprising a superframe comprising multiplexed Multicast Logical Channels (MLCs) to a receiver, the method comprising encoding overhead information symbol (OIS) information in a first burst of the MLC of each superframe, wherein the OIS information comprises control channel (CC) information and reserved flow data comprising primary flow data, service information data, notification flow data, configuration flow data, and presentation metadata; encoding padding in the second burst of the MLC; encoding parity bytes in third and fourth bursts of the MLC; encoding the primary flow data in a final MLC burst per superframe; encoding the remaining reserved flow data at an end of the superframe; transmitting the wireless data stream comprising data packets comprising the first MLC with a forward error correction (FEC) rate equal to ½ from the transmitter; receiving the wireless data stream in the receiver; determining a correctness of the CC information by checking cyclic redundancy check (CRC) bits at the end of each received data packet within CC information; determining a correctness of the primary flow data by checking CRC bits of the primary flow data; and the transmitter sending the remainder of the reserved flows at the end of the superframe according to the sizes of the reserved flows.

The method may further comprise parsing the CC information thereby allowing the receiver to determine the position of the primary flow data before the first burst of the MLC of the primary flow data arrives; wherein the determining a correctness of the CC information by checking CRC bits at the end of each received data packet within the CC information further comprises if an error is detected, waiting until the second superframe to arrive to reacquire a CC burst and if no error is detected within the CC burst, starting the parsing process. The acquisition of the CC information and the primary flow data occur in the same superframe. Preferably, determining changes in a cached reserve flow data from the primary flow data by determining if there are changes in cached reserved flow data saved in a buffer in the receiver from the received primary flow data; if there are changes in the cached reserved flow data saved in the buffer from the received primary flow data, keeping buffered burst of reserved flow data until a complete data packet is received; and if there are changes in the cached reserved flow data saved in the buffer from the received primary flow data, parsing cached version of reserved flow data and discarding buffered bursts of reserved flow data.

Furthermore, when the primary flow data is acquired, the receiver is notified whether there are changes in the cached reserved flow data. The method may further comprise, if the receiver detects reserved flow data changes from the primary flow data, then the receiver retains the buffered bursts of the reserved flow data until an entire message is received. Furthermore, if the receiver is notified from the primary flow data that the cached version of the reserved flow data is the one which will be used, then the receiver discarding those buffered bursts of the reserved flow data.

Another embodiment includes a System for fast common overhead services acquisition for MediaFLO™ (forward link only) mobile multimedia multicast system comprising multiplexed MLCs, wherein the system comprises a transmitter and a receiver that receives digital signals comprising a MediaFLO™ mobile multimedia multicast system superframe encoding OIS information in a first burst of the MLC of each superframe, wherein the OIS information comprises CC information and reserved flow data comprising primary flow data, service information data, notification flow data, configuration flow data, and presentation metadata; encodes padding in the second burst of the MLC; encoding parity bytes in third and fourth bursts of the MLC; encodes the primary flow data in the final MLC burst per superframe; encodes the remaining reserved flow data at an end of the superframe; transmits the wireless data stream comprising data packets comprising the first MLC with a FEC rate equal to ½ from the transmitter; receives the wireless data stream in the receiver; determines correctness of the CC information by checking CRC bits at the end of each received data packet within CC information; determines correctness of the primary flow data by checking CRC bits of the primary flow data; and the transmitter sending the remainder of the reserved flows at the end of the superframe according to the sizes of the reserved flows.

The system may further be adapted to parse the CC information thereby allowing the receiver to determine the position of the primary flow data before the first burst of the MLC of the primary flow data arrives; wherein the determining a correctness of the CC information by checking CRC bits at the end of each received data packet within the CC information further comprises if an error is detected, waiting until the second superframe to arrive to reacquire a CC burst and if no error is detected within the CC burst, starting the parsing process. Preferably the acquisition of the CC information and primary flow data occur in the same superframe. Furthermore, the system may further be adapted to determine changes in the cached reserve flow data from the primary flow data by determining if there are changes in cached reserved flow data saved in a buffer in the receiver from the received primary flow data; if there are changes in the cached reserved flow data saved in the buffer from the received primary flow data, keeping buffered burst of reserved flow data until a complete data packet is received; and if there are changes in the cached reserved flow data saved in the buffer from the received primary flow data, parsing cached version of reserved flow data and discarding buffered bursts of reserved flow data.

Moreover, when the primary flow data is acquired, the receiver is notified whether there are changes in the cached reserved flow data. Additionally, if the receiver detects reserved flow data changes from the primary flow data, then the receiver retains the buffered bursts of the reserved flow data until an entire message is received. Furthermore, if the receiver is notified from the primary flow data that the cached version of the reserved flow data is the one which will be used, then the receiver discarding those buffered bursts of the reserved flow data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
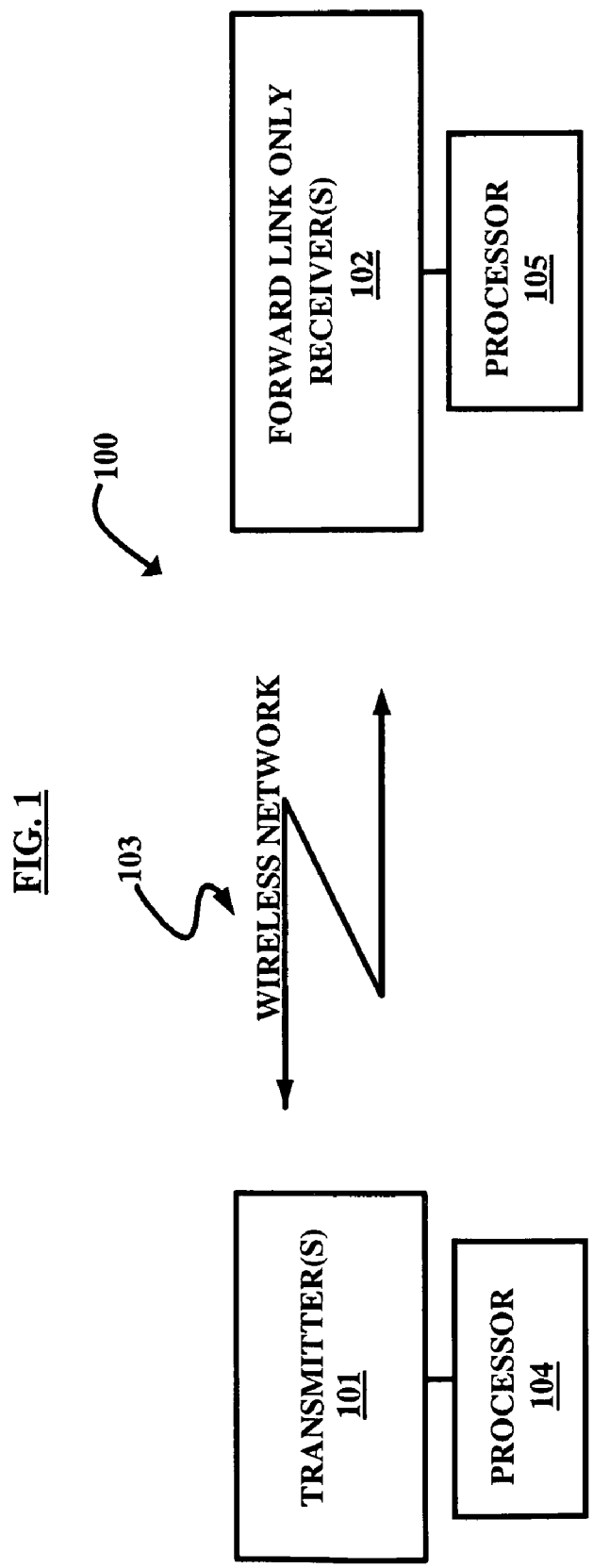
FIG. 1 illustrates a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an efficient technique for fast common overhead services acquisition for MediaFLO™ systems. Referring now to the drawings, and more particularly to FIGS. 1 through 8, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 101 which include processors 104 that communicate across a wireless network 103 to one or more receivers 102 that include processors 105. One or more processors 104, 105 may be operatively connected to the one or more transmitters 101 and receivers 102, respectively to facilitate processing of computer instructions to be utilized by the one or more transmitters 101 and receivers 102, respectively.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 102) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 102 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
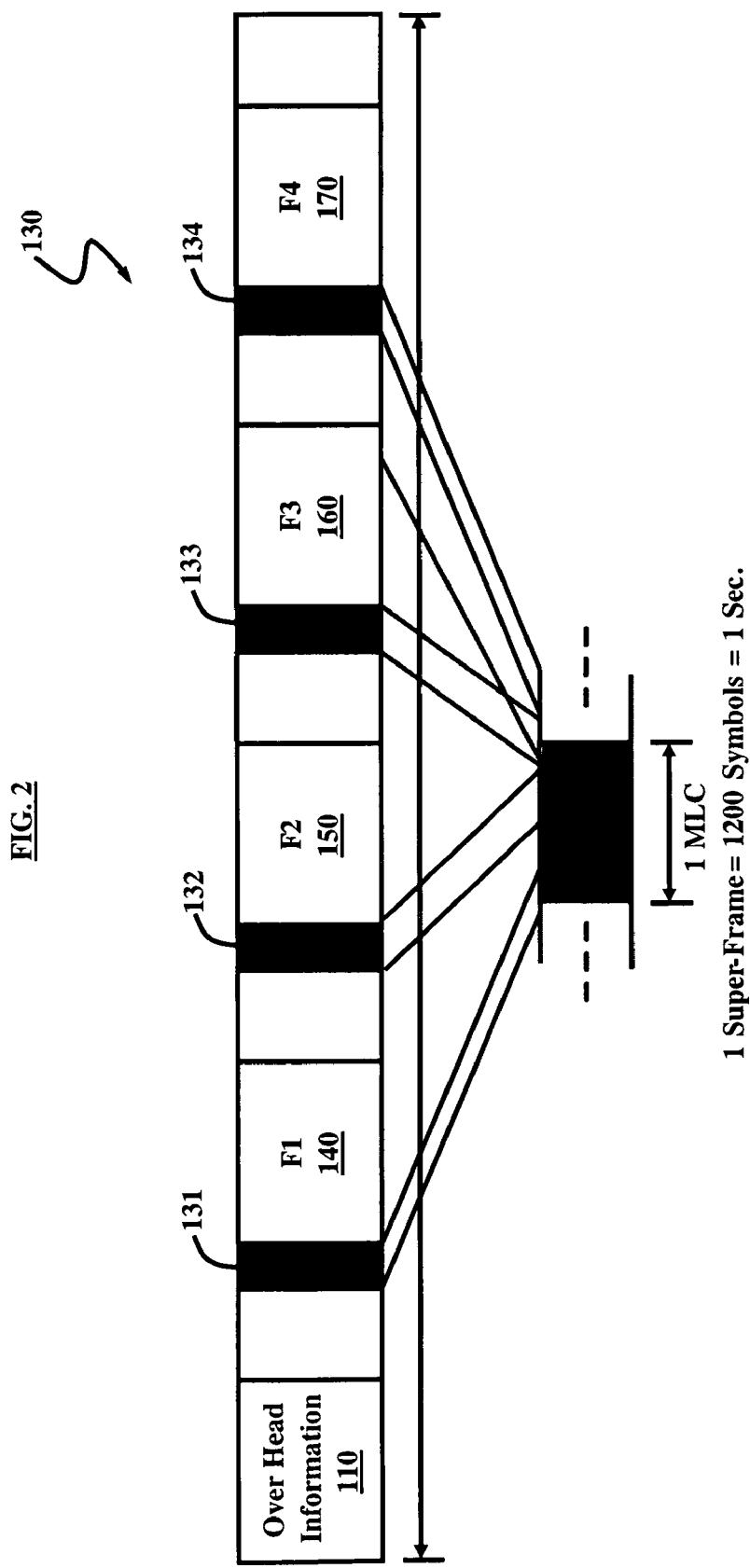
FIG. 2 illustrates a schematic diagram of a superframe according to an embodiment herein.

The MediaFLO™ (forward link only) system is an alternative mobile multicast technology for the efficient transmission of multi-media streams to mobile devices using TV. Multi-media streams can be various channels coming from different sources. The smallest channel transmission unit is a MLC. Various frames 140, 150, 160, 170 separate the MLCs 131, 132, 133, and 134, which are multiplexed together to form a superframe 130 as shown in FIG. 2. A superframe 130 constitutes 1200 symbols which are transmitted in a second.

In MediaFLO™ mobile TV systems, a service is an aggregation of one or more independent data components (e.g., audio, video, etc.). Each independent data component of a service is called a flow. As mentioned, services are carried on logical channels called MLCs. And, namely stream 2 (S2), stream 1 (S1), and stream 0 (S0). The multiplex of MLCs that is transmitted every second is called a superframe. Services that carry audio and video content are called real-time services. Real-time services typically require special handling due to real-time constrains of audio and video playing and synchronization.

Figure 3:
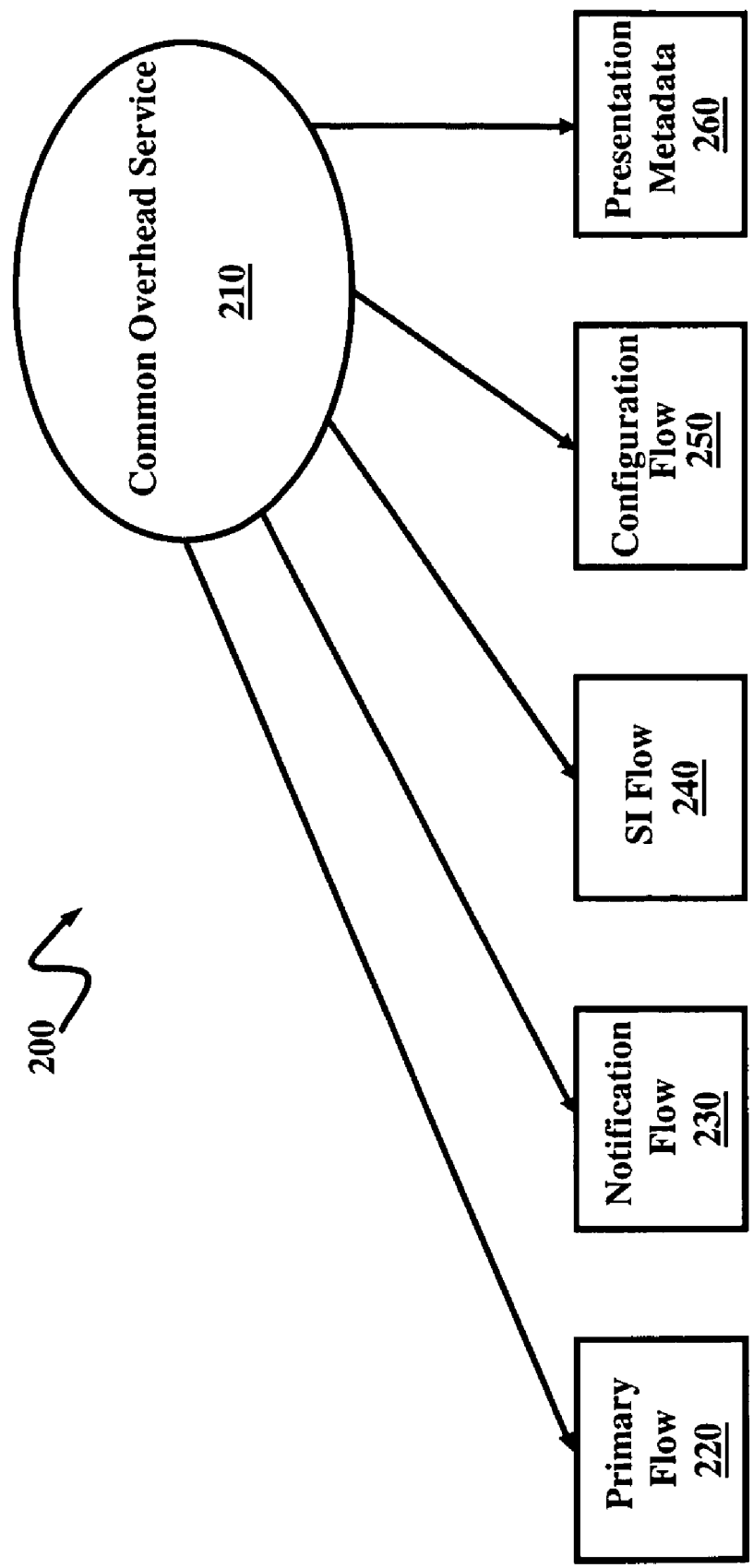
FIG. 3 illustrates a schematic diagram of a common overhead service according to an embodiment herein.

At the receiver 102, a stream of transmitted superframes 130 in which each MLC 131-134 represents a flow of audio and video information of a certain channel. To view a channel at the receiver's end, common overhead service acquisition 210 must be performed in which the receiver 102 acquires some overhead information that allows the device to locate and access services carried in the received superframes 130 as shown in FIG. 3. The overhead services acquisition includes: control channel (CC) which maps a certain service to a specific MLC in the superframe 130; primary flow 220 carries the primary message, which notifies the devices of the current version of other common overhead messages, to detect updates to service information (SI), notification etc. The device checks whether it has all the latest common overhead data by processing the primary message. If the primary message indicates that later versions are available, the device acquires updated service information (SI), notification messages, or configuration. The notification flow 230 carries notification messages which convey notifications from the network to subsets of devices related to overhead activities such as service alerts, availability of application up-gradates. Service information (SI) flow 240 carries system information, which provides the service definitions, media presentation guide (MPG), and marketplace information. The configuration flow 250 carries updates to network-wide operational parameters such as classification schemes related to user interface activities on the devices. Presentation metadata 260 related to the content of real time services may be available in Stream 0 of MLCs.

Figure 4:
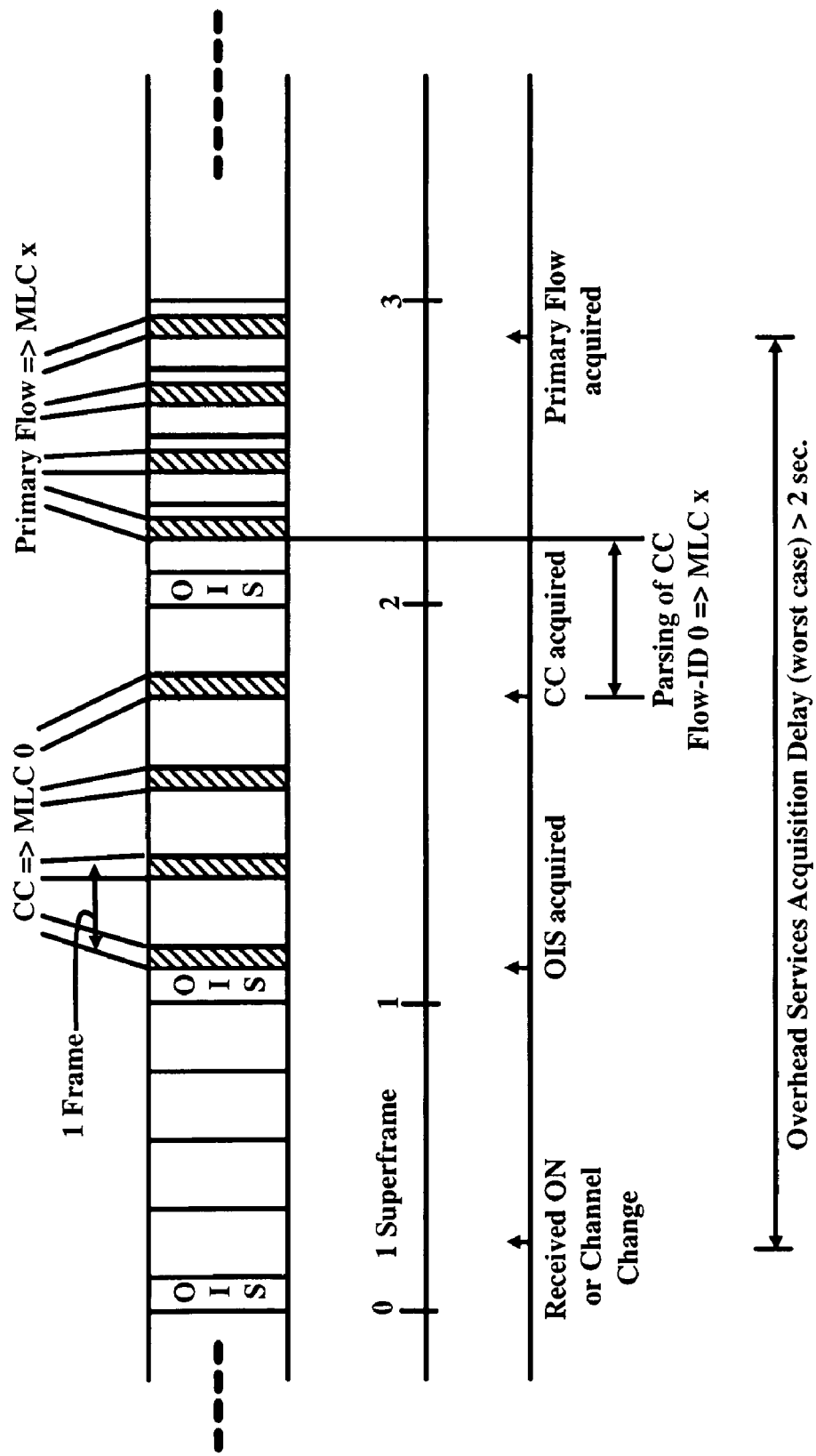
FIG. 4 illustrates an example of overhead service acquisition in a MediaFLO™ system according to a conventional solution.

Common Overhead Acquisition is a must to be performed at the receiver before the user can view the demanded channel. FIG. 4 is an illustration of overhead services acquisition delay which is of more than two seconds. The receiver acquires the OIS symbols to get the CC position. The CC information is found in MLC-ID =0. Parsing of this CC is performed to get the MLC-IDs of the reserved flows. The receiver must acquire the primary flow 220 (Flow-ID 00) to run the desired service. These steps take at least 2 seconds. If for example, the worst case occurs when the receiver is ON just after the OIS symbols of a superframe as shown in FIG. 4. This large initial acquisition delay is a problem.

With reference to FIGS. 1 through 3, the solution provided by the embodiments herein is based on the assumption that the sizes of CC and most of the reserved flows are small (i.e., could easily fit in one frame only of an MLC in the superframe 130). First, the embodiments herein send the CC at the beginning of the superframe 130 (first MLC 131). As such, the total useful control information for the receiver 102 is sent in the first burst of the MLC 131, and the next burst contains padding. The CC MLC is sent with a Forward Error Correction (FEC) rate=½, the last two bursts in the MLC 131 contain parity bits, which are additional bits appended to data for the error correction as shown in FIG. 5.

Figure 5:
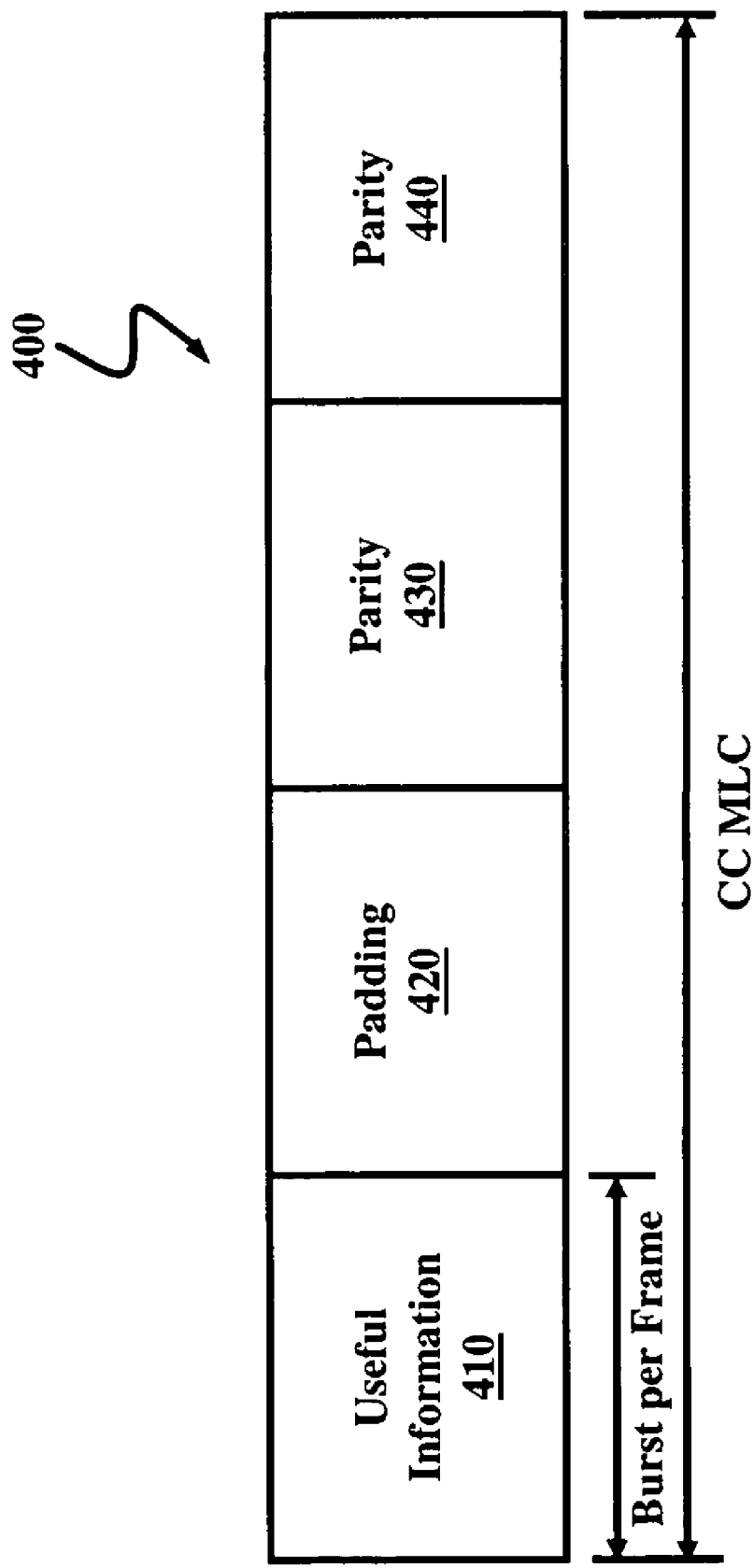
FIG. 5 illustrates a block diagram of an MLC containing CC payload according to an embodiment herein.

The payload of CC is illustrated in an example in FIG. 5. This is the first MLC released by the transmitter 101 (of FIG. 1) in every frame. The CC payload carries useful information 410 in the first burst, padding 420 in the second burst, and parity 430, 440 in the third and fourth bursts.

Next, the embodiments herein send the primary flow 220 at the end of the superframe 130 (last MLC 134). Accordingly, the primary flow 220 is sent in the last MLC burst per frame, to allow the receiver 102 to parse the CC information and thus the receiver 102 can know the position of the primary flow 220 before the first burst of the primary flow 220 arrives. At the receiver 102, the correct reception of CC bursts are checked. The CC burst contains the MLC-ID of reserved flows, thus the receiver 102 makes sure that the CC is correct before starting the parsing procedure; this can be accomplished by checking the cyclic redundancy check (CRC) bits at the end of each received data packet within the CC burst. If an error is detected, the receiver 102 will have to wait until the next superframe to reacquire the CC burst. If no error is detected within the CC burst, the receiver 102 will start parsing CC to determine the position of the reserved flows.

Figure 6:
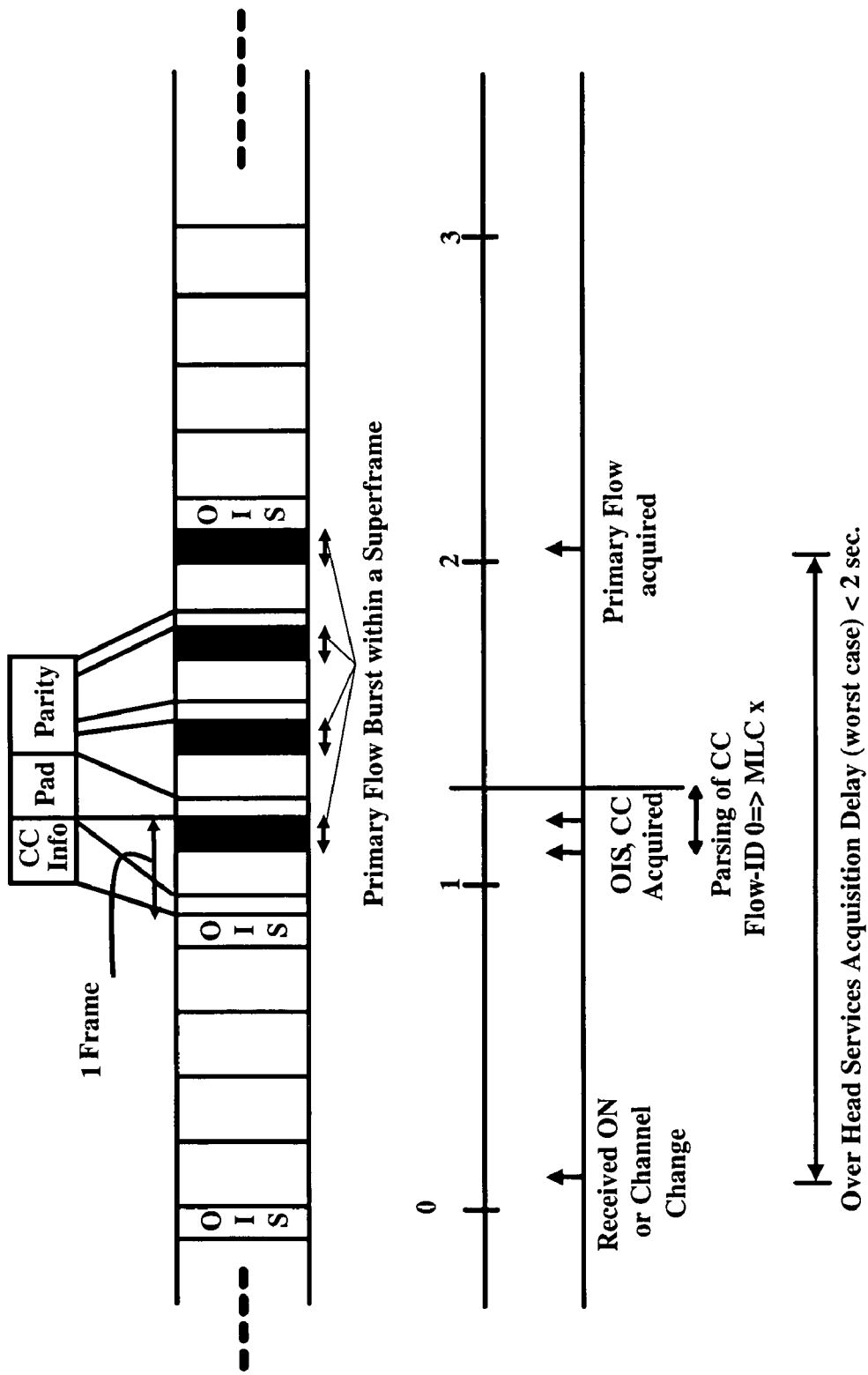
FIG. 6 illustrates a schematic diagram of an example of overhead services acquisition in a MediaFLO™ system according to an embodiment herein.

Thereafter, the primary flow 220 is checked. The receiver 102 ensures correct reception of the primary flow 220 because this message notifies the receiver 102 with any changes in the current rest reserved flows. Accordingly, the receiver 102 checks the CRC bits of the primary flow 220. Therefore, as shown in FIG. 6, the acquisition of CC information and primary flow 220 occurs in the same superframe 130, as a result the overhead services acquisition delay is reduced by one second (time waste of waiting until the next superframe 130 to acquire the primary flow 220). In other words, the solution for reducing overhead services acquisition time reduction is re-configuring the superframe structure 130 (of FIG. 2) as illustrated in FIG. 6. As illustrated, since the receiver 102 is ON or channel changes it takes less than two seconds to acquire OIS, CC, and primary flow.

The transmitter 101 can send the rest of the reserved flows at the end of the superframe 130 according to their respective sizes. In other words, the other reserved flows vary in size, but the transmitter 101 can still send them at the end of the superframe 130 so that the receiver 102 can start reception of the other reserved flows and buffer them anyway. When the primary flow 220 is acquired, the receiver 102 will be notified whether there are changes in the cached reserved flows (i.e., already saved versions of reserved flows). If the receiver 102 detects reserved flows' changes from the primary flow 220, it will keep buffered bursts of a reserved flow until the entire message is received (it can be in more than 1 superframe like the MPG). If the receiver 102 is notified from the primary flow 220 that the cached version of a reserved flow is the one which will be used, then the receiver 102 discards those buffered bursts of reserved flows.

Figure 7:
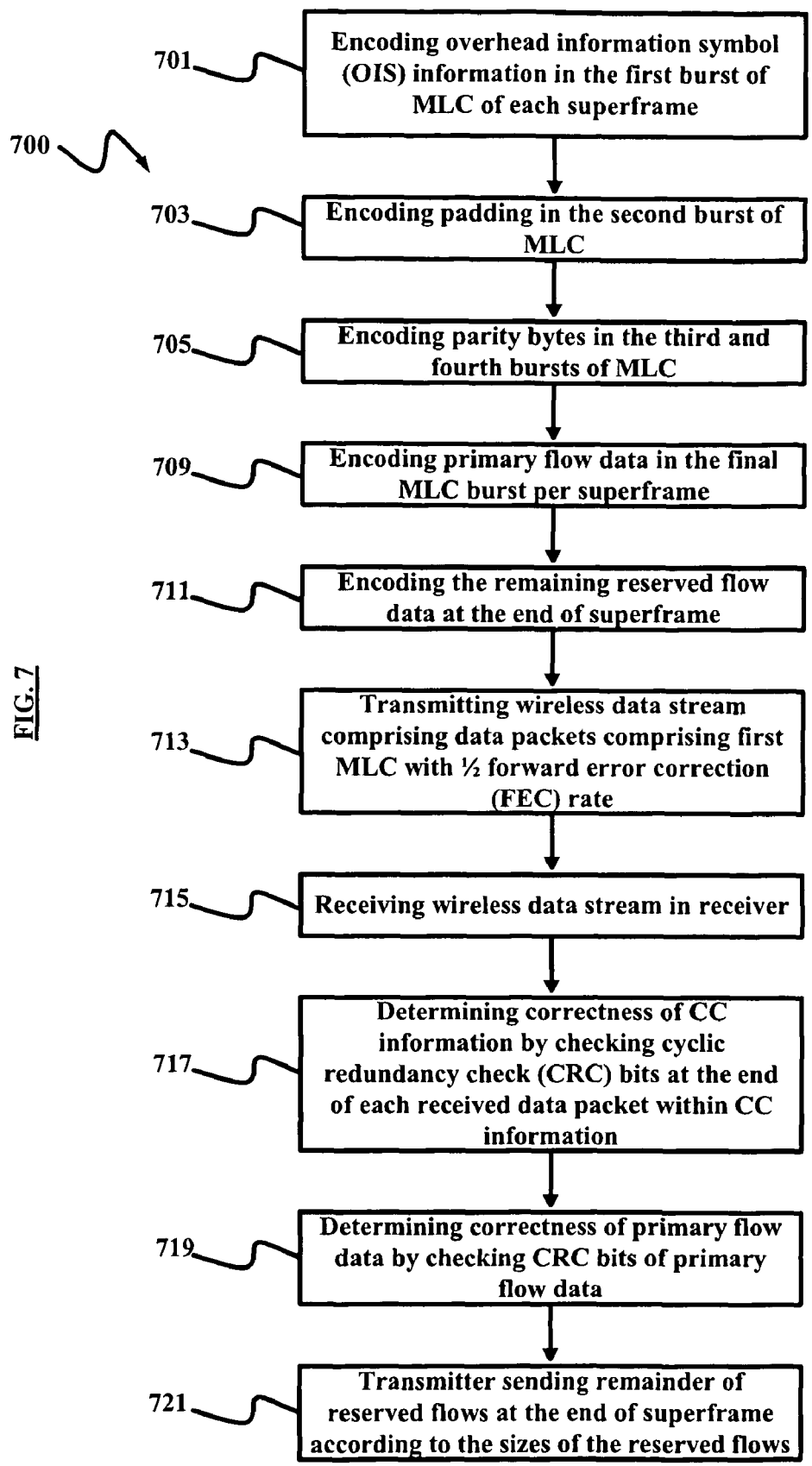
FIG. 7 is a flow diagram illustrating a preferred method according to an embodiment herein.

FIG. 7, with reference to FIGS. 1 through 3 and 5 through 6 illustrates a flow diagram illustrating a method 700 for fast common overhead services acquisition for MediaFLO™ (forward link only) mobile multimedia multicast system 100 comprising a transmitter 101 that transmits a wireless data stream comprising a superframe 130 comprising multiplexed MLCs to a receiver 102, wherein the method comprises encoding (701) OIS information 110 in a first burst of the MLC of each the superframe 130, wherein the OIS information 110 comprises CC information and reserved flow data comprising primary flow data 220, service information data 240, notification flow data 230, configuration flow data 250, and presentation metadata 260; encoding (703) padding 420 in a second burst of the MLC; encoding (705) parity bytes 430, 440 in third and fourth bursts of the MLC; encoding (709) the primary flow data 220 in a final MLC burst per superframe 130; encoding (711) the remaining reserved flow data at an end of the superframe 130; transmitting (713) the wireless data stream comprising data packets comprising the first MLC with a FEC rate equal to ½ from the transmitter 101; receiving (715) the wireless data stream in the receiver 102; determining (717) the correctness of the CC information by checking CRC bits at the end of each received data packet within the CC information; determining (719) a correctness of the primary flow data 220 by checking the CRC bits of the primary flow data 220; and the transmitter 101 sending (721) the remainder of the reserved flows at the end of the superframe 130 according to the sizes of the reserved flows.

The method may further comprise parsing the CC information thereby allowing the receiver 102 to determine the position of the primary flow data 220 before the first burst of the MLC of the primary flow data 220 arrives; wherein the determining (719) a correctness of the CC information by checking CRC bits at the end of each received data packet within the CC information further comprises if an error is detected, waiting until the second superframe to arrive to reacquire a CC burst and if no error is detected within the CC burst, starting the parsing process. The acquisition of the CC information and the primary flow data 220 occur in the same superframe 130. Preferably, determining changes in a cached reserve flow data from the primary flow data 220 by determining if there are changes in cached reserved flow data saved in a buffer (not shown) in the receiver 102 from the received primary flow data 220; if there are changes in the cached reserved flow data saved in the buffer from the received primary flow data 220, keeping buffered burst of reserved flow data until a complete data packet is received; and if there are changes in the cached reserved flow data saved in the buffer from the received primary flow data, parsing the cached version of the reserved flow data and discarding buffered bursts of reserved flow data.

Furthermore, when the primary flow data 220 is acquired, the receiver 102 is notified whether there are changes in the cached reserved flow data. The method further comprises, if the receiver 102 detects reserved flow data changes from the primary flow data 220, then the receiver 102 retains the buffered bursts of the reserved flow data until an entire message is received. Furthermore, if the receiver 102 is notified from the primary flow data 220 that the cached version of the reserved flow data is the one which will be used, and then the receiver 102 discards those buffered bursts of the reserved flow data.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
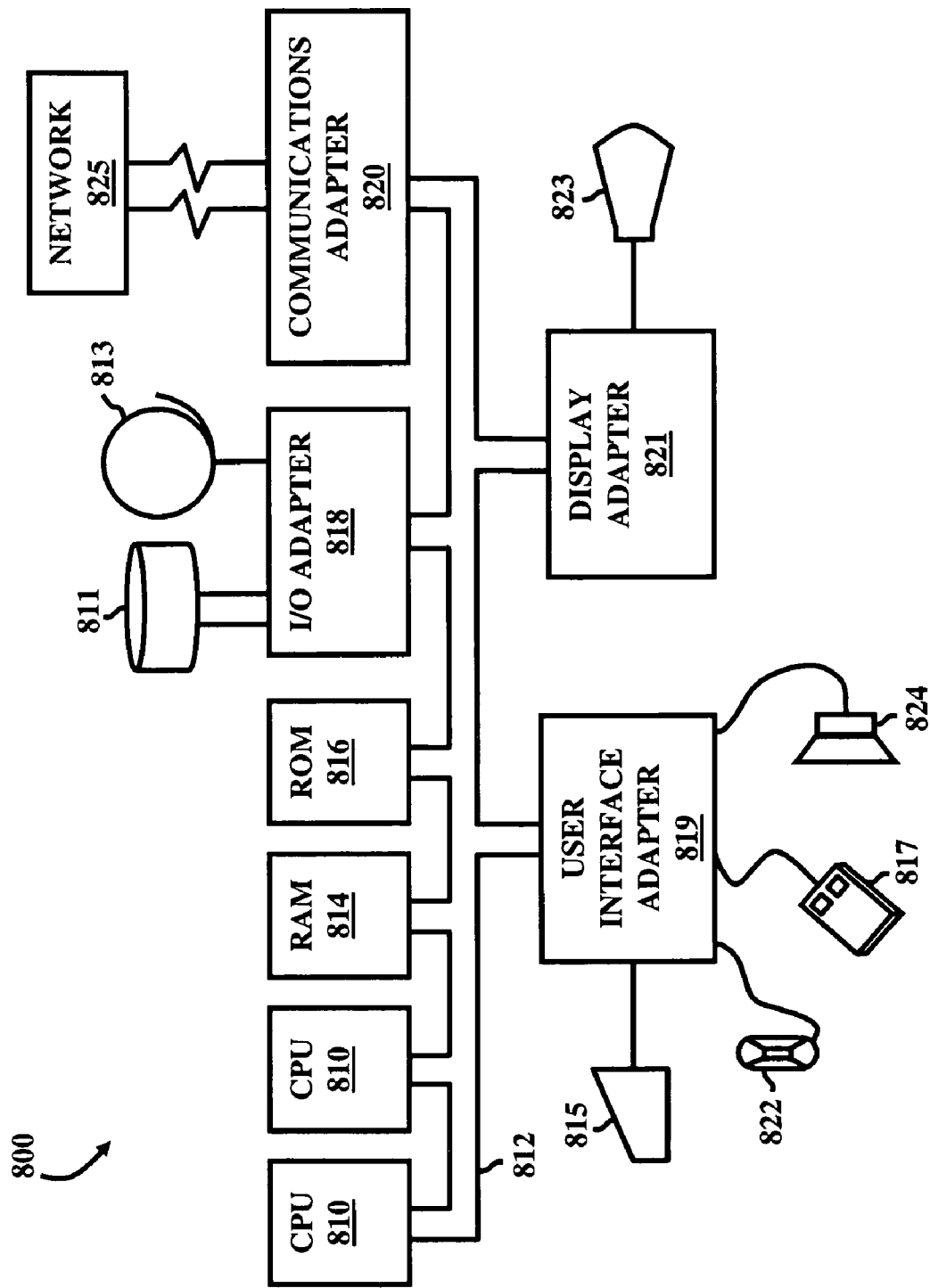
FIG. 8 illustrates a schematic diagram of a computer architecture used in accordance with the embodiments herein.

A representative hardware environment for practicing the embodiments herein is depicted in FIG. 8. This schematic drawing illustrates a hardware configuration of an information handling/computer system 5 in accordance with the embodiments herein. The system 800 comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system 800. The system 800 can read the inventive instructions on the program storage devices and follow these instructions to execute the methodology of the embodiments herein. The system 800 further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for fast common overhead services acquisition for mobile multimedia multicast system comprising a transmitter that transmits a wireless data stream comprising a superframe comprising multiplexed Multicast Logical Channels (MLCs) to a receiver, said method comprising:

encoding overhead information symbol (OIS) information in a first burst of said MLC of each said superframe, wherein said OIS information comprises control channel (CC) information providing service to said MLC in said superframe and reserved flow data comprising: primary flow data carrying a primary message and notifying a device of the current version of other common overhead messages to detect updates to service information, service information data providing service definitions, media presentation guide (MPG), and marketplace information, notification flow data conveying notifications from network to said device related to overhead activities, configuration flow data carrying updates to network-wide operation parameters comprising classification schemes related to user interface activities on said device, and presentation metadata relating to content of real time services;

encoding padding in a second burst of said MLC;

encoding parity bytes in third and fourth bursts of said MLC;

encoding said primary flow data in a final MLC burst per superframe;

encoding the remaining reserved flow data at an end of said superframe;

transmitting said wireless data stream comprising data packets comprising said first MLC with a forward error correction (FEC) rate equal to ½ from said transmitter;

receiving said wireless data stream in said receiver;

determining a correctness of said CC information by checking cyclic redundancy check (CRC) bits at the end of each received data packet within said CC information;

determining a correctness of said primary flow data by checking said CRC bits of said primary flow data; and said transmitter sending the remainder of said reserved flows at the end of said superframe according to the sizes of said reserved flows.

2. The method of claim 1, further comprising parsing said CC information thereby allowing said receiver to determine the position of said primary flow data before said first burst of said MLC of said primary flow data arrives.

3. The method of claim 2, wherein said determining a correctness of said CC information by checking CRC bits at the end of each received data packet within said CC information further comprises:

if an error is detected, waiting until a second superframe to arrive to reacquire a CC burst; and if no error is detected within said CC burst, starting the parsing process.

4. The method of claim 1, wherein acquisition of said CC information and said primary flow data occur in the same superframe.

5. The method of claim 2, further comprising determining changes in a cached reserved flow data from said primary flow data by:

determining if there are changes in said cached reserved flow data saved in a buffer in said receiver from said received primary flow data;

if said receiver detects changes in said cached reserved flow data saved in said buffer from said received primary flow data, keeping buffered burst of reserved flow data until a complete data packet is received; and if said receiver is notified that said cached reserved flow is to be used, parsing said cached reserved flow data and discarding buffered bursts of reserved flow data.

6. The method of claim 5, wherein when said primary flow data is acquired, said receiver is notified whether there are changes in said cached reserved flow data.

7. The method of claim 6, wherein if said receiver detects said cached reserved flow data changes from said primary flow data, then said receiver retains the buffered bursts of said reserved flow data until an entire message is received.

8. The method of claim 6, wherein if said receiver is notified from said primary flow data that said cached reserved flow data is the one which will be used, then said receiver discards said buffered bursts of said reserved flow data.

9. A system for fast common overhead services acquisition for mobile multimedia multicast system that transmits a wireless data stream comprising a superframe comprising multiplexed Multicast Logical Channels (MLCs), said system comprising:

a transmitter that encodes overhead information symbol (OIS) information in a first burst of said MLC of each said superframe, wherein said OIS information comprises:

control channel (CC) information providing service to said MLC in the said superframe; and reserved flow data comprising:

primary flow data carrying a primary message and notifying a device of the current version of other common overhead messages to detect updates to service information, service information data providing service definitions, media presentation guide (MPG), and marketplace information, notification flow data conveying notifications from network to said device related to overhead activities, configuration flow data carrying updates to network-wide operation parameters comprising classification schemes related to user interface activities on said device, and presentation metadata relating to content of real time services;

wherein said transmitter further:

encodes padding in a second burst of said MLC;

encodes parity bytes in third and fourth bursts of said MLC;

encodes said primary flow data in a final MLC burst per superframe;

encodes the remaining reserved flow data at an end of said superframe;

transmits said wireless data stream comprising data packets comprising said first MLC with a forward error correction (FEC) rate equal to ½;

a receiver that receives said wireless data stream, wherein said receiver further:

determines a correctness of said CC information by checking cyclic redundancy check (CRC) bits at the end of each received data packet within said CC information; and determines a correctness of said primary flow data by checking said CRC bits of said primary flow data, wherein said transmitter sends the remainder of said reserved flows at the end of said superframe according to the sizes of said reserved flows.

10. The system of claim 9, further comprising said receiver parsing said CC information thereby allowing said receiver to determine the position of said primary flow data before said first burst of said MLC of said primary flow data arrives.

11. The system of claim 10, wherein said determining correctness of said CC information by checking CRC bits at the end of each received data packet within said CC information further comprises:

if an error is detected, waiting until a second superframe to arrive to reacquire a CC burst; and if no error is detected within said CC burst, starting the parsing process.

12. The system of claim 9, wherein acquisition of said CC information and said primary flow data occur in the same superframe.

13. The system of claim 10, further comprising determining changes in a cached reserved flow data from said primary flow data by:
   determining if there are changes in said cached reserved flow data saved in a buffer in said receiver from said received primary flow data;
   if said receiver detects changes in said cached reserved flow data saved in said buffer from said received primary flow data, keeping buffered burst of reserved flow data until a complete data packet is received; and
   if said receiver is notified that said cached reserved flow is to be used, parsing said cached version of reserved flow data and discarding buffered bursts of reserved flow data.

14. The system of claim 13, wherein when said primary flow data is acquired, said receiver is notified whether there are changes in said cached reserved flow data.

15. The system of claim 14, wherein if said receiver detects said cached reserved flow data changes from said primary flow data, then said receiver retains the buffered bursts of said reserved flow data until an entire message is received.

16. The system of claim 14, wherein if said receiver is notified from said primary flow data that said cached reserved flow data is the one which will be used, then said receiver discards buffered bursts of said reserved flow data.

17. A system for fast common overhead services acquisition for mobile multimedia multicast system that transmits a wireless data stream comprising a superframe comprising multiplexed Multicast Logical Channels (MLCs), said system comprising:
   a transmitter for encoding overhead information symbol (OIS) information in a first burst of said MLC of each said superframe, wherein said OIS information comprises:
      control channel (CC) information providing service to said MLC in the said superframe; and
      reserved flow data further comprising:
         primary flow data carrying a primary message and notifying a device of the current version of other common overhead messages to detect updates to service information,
         service information data providing service definitions, media presentation guide (MPG), and marketplace information,
         notification flow data conveying notifications from network to said device related to overhead activities,
         configuration flow data carrying updates to network-wide operation parameters comprising classification schemes related to user interface activities on said device, and
         presentation metadata relating to content of real time services;
   wherein said transmitter further:
      encodes padding in a second burst of said MLC;
      encodes parity bytes in third and fourth bursts of said MLC;
      encodes said primary flow data in a final MLC burst per superframe;
      encodes the remaining reserved flow data at an end of said superframe; and
      transmits said wireless data stream comprising data packets comprising said first MLC with a forward error correction (FEC) rate equal to ½; and
   a receiver receiving said wireless data stream, wherein said receiver further:
      determines a correctness of said CC information by checking cyclic redundancy check (CRC) bits at the end of each received data packet within said CC information;
      determines a correctness of said primary flow data by checking said CRC bits of said primary flow data.

18. The system of claim 17, wherein when said primary flow data is acquired, said receiver is notified whether there are changes in a cached reserved flow data.

19. The system of claim 18, wherein if said receiver detects said cached reserved flow data changes from said primary flow data, then said receiver retains the buffered bursts of said cached reserved flow data until an entire message is received.

20. The system of claim 18, wherein if said receiver is notified from said primary flow data that said cached reserved flow data is the one which will be used, then said receiver discards those buffered bursts of said reserved flow data and re-enters the three empty bytes in the memory address of said service packet header from its saved address;
   configures fragment headers bit containing the last fragment information; and
   places service packet length information in said service packet header.

* * * * *